United States Patent
Wendt et al.

(10) Patent No.: US 9,062,702 B2
(45) Date of Patent: Jun. 23, 2015

(54) CONNECTING ELEMENT AND METHOD FOR MANUFACTURING A CONNECTING ELEMENT

(75) Inventors: Roland Wendt, Argenbühl (DE); Michael Badent, Weingarten (DE); Wolfgang Pfeiffer, Markdorf (DE); Ewald Wennehorst, Iserlohn (DE); Karlheinz Munz, Künzelsau (DE)

(73) Assignees: Tox Pressotechnik GmbH & Co. KG, Weingarten (DE); Nedschroef Altena GmbH, Altena (DE)

( * ) Notice: Subject to any disclaimer, the term of this patent is extended or adjusted under 35 U.S.C. 154(b) by 199 days.

(21) Appl. No.: 13/558,658

(22) Filed: Jul. 26, 2012

(65) Prior Publication Data
US 2013/0115027 A1    May 9, 2013

Related U.S. Application Data

(63) Continuation of application No. PCT/EP2011/000363, filed on Jan. 27, 2011.

(30) Foreign Application Priority Data

Jan. 27, 2010   (DE) .................. 10 2010 006 000

(51) Int. Cl.
| | |
|---|---|
| F16B 19/06 | (2006.01) |
| F16B 19/08 | (2006.01) |
| B21K 1/58 | (2006.01) |
| F02D 13/04 | (2006.01) |
| F16B 5/04 | (2006.01) |

(52) U.S. Cl.
CPC ................. *F16B 19/086* (2013.01); *B21K 1/58* (2013.01); *F02D 13/04* (2013.01); *F16B 5/04* (2013.01)

(58) Field of Classification Search
CPC .......... F16B 19/086; F16B 5/04; F02D 13/04; B21K 1/58
USPC .......................... 411/501, 504, 508, 509, 510
See application file for complete search history.

(56) References Cited

U.S. PATENT DOCUMENTS

| | | | |
|---|---|---|---|
| 1,647,062 A | 10/1927 | Stresau | |
| 3,767,018 A * | 10/1973 | Gordon | ........................ 411/501 |
| 3,909,913 A * | 10/1975 | Tildesley | ...................... 411/968 |

(Continued)

FOREIGN PATENT DOCUMENTS

| | | |
|---|---|---|
| DE | 297 07 669 U1 | 7/1997 |
| DE | 298 01 049 U1 | 4/1998 |

(Continued)

OTHER PUBLICATIONS

German Search Report dated Nov. 22, 2010.
(Continued)

*Primary Examiner* — Gay Ann Spahn
(74) *Attorney, Agent, or Firm* — Burr & Brown, PLLC

(57) ABSTRACT

A connecting element for forming a punch-riveted connection of at least two component sections is provided, wherein a foot section has at its free end a foot base with a basic shape which is cylindrical or at least approximated to the cylindrical shape. According to the invention, an annular circumferential elevated portion is formed in the foot section between the foot base and the shaft section.

16 Claims, 3 Drawing Sheets

(56) References Cited

U.S. PATENT DOCUMENTS

| | | | | |
|---|---|---|---|---|
| 3,911,783 | A | * | 10/1975 | Gapp et al. ................. 411/504 |
| 3,995,406 | A | * | 12/1976 | Rosman ..................... 411/507 |
| 4,026,341 | A | * | 5/1977 | Menke ...................... 411/103 |
| 4,126,076 | A | * | 11/1978 | Rosman ..................... 411/507 |
| 4,202,243 | A | * | 5/1980 | Leonhardt .................. 411/501 |
| 4,555,838 | A | * | 12/1985 | Muller ..................... 411/107 |
| 4,642,869 | A | * | 2/1987 | Muller ..................... 411/179 |
| 4,711,021 | A | * | 12/1987 | Muller ..................... 411/179 |
| 4,978,270 | A | | 12/1990 | Ackerman |
| 6,244,808 | B1 | * | 6/2001 | Donhauser ................. 411/504 |
| 6,308,544 | B1 | | 10/2001 | Kuehnl et al. |
| 6,527,490 | B1 | | 3/2003 | Donhauser |
| 6,722,013 | B1 | * | 4/2004 | Rapp ....................... 411/492 |
| 8,616,039 | B2 | * | 12/2013 | Maloney .................... 72/352 |
| 2005/0281632 | A1 | | 12/2005 | Donhauser |
| 2006/0010671 | A1 | | 1/2006 | Mair et al. |
| 2006/0016056 | A1 | * | 1/2006 | Kato ....................... 29/34 B |
| 2006/0039778 | A1 | | 2/2006 | Palm |
| 2006/0251495 | A1 | * | 11/2006 | Opper ...................... 411/501 |
| 2010/0119330 | A1 | * | 5/2010 | Auriol ..................... 411/501 |
| 2013/0205576 | A1 | * | 8/2013 | Bense et al. ............... 411/501 |

FOREIGN PATENT DOCUMENTS

| | | |
|---|---|---|
| DE | 299 08 928 U1 | 10/2000 |
| DE | 102 59 334 C1 | 12/2003 |
| DE | 102 59 370 B3 | 4/2004 |
| DE | 102 59 369 B3 | 5/2004 |
| DE | 103 01 114 A1 | 7/2004 |
| DE | 103 23 740 A1 | 12/2004 |
| WO | 2006/047077 A2 | 5/2006 |

OTHER PUBLICATIONS

International Search Report and Written dated Apr. 4, 2011.

* cited by examiner

CONNECTING ELEMENT AND METHOD FOR MANUFACTURING A CONNECTING ELEMENT

CROSS REFERENCE TO RELATED APPLICATIONS

This application is a continuation of International Application No. PCT/EP2011/000363 filed Jan. 27, 2011, which designated the United States, and claims the benefit under 35 USC §119(a)-(d) of German Application No. 10 2010 006 000.3 filed Jan. 27, 2010, the entireties of which are incorporated herein by reference.

FIELD OF THE INVENTION

The invention relates to a connection element for forming a punch rivet connection and the method for manufacturing a connection element.

BACKGROUND OF THE INVENTION

In the field of fabrication methods joining by shaping is a technology which is preferred in many applications. This also includes punch-riveting in which a connecting element such as, for example, a semi-tubular or solid punching rivet for connecting components in a punctiform fashion is introduced therein by, for example, a die acting from above on the connecting element and pushing the connecting element through a die-side upper side of the components to be connected and creating the punch-riveted connection through interaction with a bottom die. The punch-riveting serves, in particular, to connect a plurality of layers of sheet metal, wherein the components to be connected are not previously perforated at the connecting point which comes about.

A solid punching rivet can be divided over its length into different sections such as a head section, a shaft section and a foot section with a cutting edge.

The known connecting elements are not yet mature technology in all points with respect to a wide variety of connecting functions, for example, as a function of the type and number of components to be connected to one another and/or with respect to manufacture of the connecting element which is to be implemented technically and economically.

At present, these connecting elements are manufactured in a costly metal-cutting fashion.

SUMMARY OF THE INVENTION

The object of the present invention is to improve punch-riveted connections with respect to technical and economic criteria.

The present invention is firstly based on a connecting element for forming a punch-riveted connection of at least two component sections, wherein the connecting element is divided over its length into a head section, a foot section and a shaft section which extends between the head section and the foot section, and the foot section has at its free end a foot base with a basic shape which is cylindrical or at least approximated to the cylindrical shape. The shaft section is likewise preferably embodied in such a way that it is cylindrical or of a shape which is close to the cylindrical shape, for example, slightly elliptical in cross section, over a substantial part of its extent. If appropriate, the shaft section can be slightly conical on the outside. As a rule, the connecting element is rotationally symmetrical with respect to its longitudinal axis, but it can also differ slightly therefrom.

A significant aspect of the present invention is that an annular circumferential elevated portion is formed in the foot section between the foot base and the shaft section. Pushes can be absorbed on both sides or circumferentially in the longitudinal direction of the connecting element over the circumferential elevated portion in the foot section. As a result, the punch-riveted connection which is formed with the proposed connecting element can be improved. The length of the elevated portion itself is comparatively small compared to the overall length of the connecting element. The connecting element is also referred to as a solid punching rivet.

The connecting element according to the present invention is also distinguished by the fact that it has relatively high tolerance with respect to fluctuations in the thickness of sheet metal, with the result that for a particular length of the connecting element the thickness of the component sections to be connected can vary greatly without technical compromises having to be accepted for the connection which is created. Furthermore, it is particularly economical that a connecting element with a selected length dimension is suitable without compromise for a large number of component pairings which differ in the sum of the overall thickness of the plurality of component sections.

The circumferential elevated portion can be produced directly through a material excess with respect to adjacent sections which extend over a significant length of the connecting element and reach as far as the elevated portion without removal of material and/or the elevated portion can be produced by constriction or depression which is present directly adjacent to the elevated portion on one side or on both sides of the elevated portion.

Furthermore, it is proposed that the shaft section have a diameter which is smaller than a diameter of the foot base. In particular, the shaft section can have a maximum outer diameter in the case of an elliptical or polygonal cross section or a cylindrical diameter which is smaller than a diameter of the, in particular, cylindrical foot base. As a result, compared to known comparable connecting elements more space is available for material regions of the component sections which flow during the punch-riveting shaping process and thus bring about a change in shape of the component sections to be connected. Known connecting elements generally have a shaft section which corresponds to the diameter of the foot section. In contrast, according to the present invention more volume is available to the material of the component sections, which is filled in by shaft material in known connecting elements.

The increased expansion volume acts, in particular, advantageously to the effect that more space is available to a die-side or upper component section with which the foot section of the connecting element first comes into contact during the punch-riveting. As a result, a corresponding stress in the region of the punch-riveted connection which is embodied is also reduced by pushes in the punch-riveted component sections which act between the component sections, wherein the pushes are reduced in relation to previous connections. It is therefore possible, in particular, for mechanical stressing on the head section to be reduced compared to previous arrangements, whereby there is no longer any "flaking off" of the head section either according to the present invention, which previously could occur when connecting elements were used with, for example, a shaft section which was not reduced compared to the foot base.

It is furthermore advantageous that the shaft section is formed without an elevated portion over its longitudinal extent. This also makes it possible for more space to be available for reflowing of shaped component sections in the region of the rivet shaft. Furthermore, the manufacture of the unprofiled shaft section is simpler and a comparatively simple geometry of the connecting element can be implemented. It has also become apparent that despite the absence of elevated portions, that is to say, in particular, without grooves in the shaft an anchoring or support the component sections or of their punched edges on the outer side of the connecting element in the region of the shaft section is not found to be worse.

Furthermore, the number of different connecting elements with respect to the number of grooves in the shaft section can be minimized to one shape irrespective of how many layers of component sections have to be connected to the solid punching rivet.

Furthermore, it is advantageous that, at least in the shaft section, a region is formed in such a way that the roughness of the region is increased compared to adjacent regions. A region of the shaft section is understood to be a region of the outer surface of the shaft section. The adjacent regions with a smooth surface or with a smaller degree of roughness can be located in the shaft section itself and/or in the adjacent head section or foot section. In particular, it is advantageous that the entire shaft section is formed with increased roughness compared to the shaft section of adjacent regions. Hitherto, the entire outer circumferential surface of the solid punching rivet in relation to the longitudinal axis of the solid punching rivet has been provided with a uniform surface quality or has been made uniformly comparatively smooth. However, it may be advantageous if the roughness of at least certain regions of the shaft section is increased. The increase in the roughness has, in particular advantageously, the effect that a die-side material cannot flow downward so easily on the lateral surface or the outer side of the connecting element in the region of the shaft section. The increase in the roughness or in the associated coefficient of friction of the respective surface region may be configured in a wide variety of ways. For example, by adapting the surface structure or outer structure, such as through an applied chamfered structure, a slight corrugation or a knob-like surface structure and/or by means of a processing step which roughens the surface. The possibility is not excluded of influencing or determining the roughness through the selection of the material which forms the surface of the respective region, for example, by coating and/or by the presence of elements which change the roughness, for example, composed of a material which differs from the material from which the greater part of the shaft section is composed.

Furthermore, it is advantageous that the shaft section has, when viewed in the longitudinal direction of the connecting element, a shape which differs from the cylindrical shape. The shaft section may be configured in such a way that the shaft section tapers at least in certain sections and/or widens or differs in some other way from a cylindrical shape, wherein the deviation from the cylindrical shape may turn out to be comparatively small. A region of an outer side of the shaft section may, for example, be inclined relative to the longitudinal axis of the connecting element by fractions of an angular degree or by a few angular degrees. The shaft section of the solid punching rivet can taper or widen toward the foot section or toward the head section. The tapering or widening may occur linearly or along a curve. A combination thereof in regions of the shaft section which are adjacent to one another is also conceivable. The small deviation in shape of the shaft section from a cylindrical shape, for example, in the case of a conical or round-conical shaft section, may be advantageous when a punch-riveted connection is formed with a corresponding connecting element for connecting at least two component sections by virtue of improved anchoring of the component sections to the shaft section.

Furthermore, it is advantageous that the circumferential elevated portion has an outer diameter which is slightly smaller than a diameter of the foot base.

The circumferential elevated portion therefore has, at its outermost point in the radial direction with respect to the longitudinal axis of the connecting element, a diameter which is slightly smaller than a diameter of the foot base, in particular, smaller than a diameter of a cutting edge of the foot base. The circumferential elevated portion may have, for example, an outer diameter which is approximately 0.1 mm smaller than the outer diameter of the foot base. As a result, the elevated portion is advantageously protected with respect to possible mechanical damage when the connecting element is pushed through the component sections to be connected. The component section which is perforated with the diameter of the foot base therefore has a hole with an internal diameter which is slightly larger than the external diameter of the elevated portion, which is subsequently moved past the edge of the hole, but does not come into contact, when the connecting element is pressed in.

On the other hand, when ultra-high-strength materials are punch-riveted it is possible for edges of a punched-through hole to give rise to damage to the elevated portion, when the edges come into contact with the elevated portion, and this is disadvantageous.

A further advantageous embodiment of the present invention is distinguished by the fact that a circumferential constriction is present in a region in which the shaft section merges with the foot section.

The constriction is, in particular, directly before the circumferential elevated portion in the foot section. This constriction may, in particular, have edges which are inclined concavely and in a very flat or gentle fashion. The diameter in the base of the constriction may be, for example, only several percent smaller, for example 3% than the diameter of the shaft section which is present in the shaft section, over a substantial extent thereof.

The constriction or waist directly before the circumferential elevated portion can improve the anchoring there for shaped material of the component sections on the part of the shaft section, in particular, for interaction with the adjacent circumferential elevated portion.

Precisely one annular elevated portion is advantageously present on the foot section. This is advantageous with respect to simple geometry and economic manufacture of the connecting element. It has become apparent that an optimum state with respect to all the relevant evaluation variables is achieved with precisely one circumferential elevated portion.

It is particularly advantageous that the circumferential elevated portion merges with adjacent sections via concavely shaped regions. As a result, subsequent flowing of material of the component sections into these regions is particularly satisfactorily possible. It is therefore particularly advantageously possible for regions on the outside of the elevated portion to be filled in with shaped material and for the shaped material to flow subsequently to all the surfaces of the elevated portion and adjacent regions. Furthermore, stepless transitions of outer sections of the connecting element can also be provided with the concavely shaped regions.

In this way, the connecting element is advantageously virtually completely enclosed on the outside in a contact-forming fashion by shaped material of the component sections to be connected.

A further advantage of the present invention is the fact that an otherwise increased notching effect is reduced with the concavely shaped regions on the circumferential elevated portion or by the rounded transitions which are therefore present.

Furthermore, it is proposed that a circumferential depression be configured in the foot section between the foot base and the circumferential elevated portion. In particular, precisely one such circumferential depression is present. This permits, in particular, subsequent flowing of a bottom-die-side material of the lower bottom-die-side component section of the component sections to be connected.

The base of the respective circumferential depression, that is to say a point of the depression which is radially closest to the longitudinal axis has, in particular, substantially a diameter which corresponds to the diameter of the shaft section. This is advantageous with respect to reasons of stability of the connecting element.

Furthermore, it is advantageous that the head section has at its free end a head base with a basic shape which is cylindrical or at least approximated to the cylindrical shape. This increases the stability of the head section, in particular, against tearing off in the punch-riveted connection which is produced.

As a result of the large number of the geometry properties of the connecting element which can be adapted within certain boundaries as stated above, it is possible to configure a shape of the connecting element which is respectively optimum for a particular application.

However, in this context, the basic prescriptions explained above have to be complied with.

In individual cases, the connecting element according to the present invention can permit, through optimized adaptation, a punching force which is higher by up to 25%, in relation to the punching diameter, compared to known or comparable solid punching rivets. This has been proven, in particular, on the basis of the finite element method, a method from numerical mathematics.

Furthermore, it is proposed that a concavely formed region, which is arranged between the head base and the shaft section, is formed in the head section. In particular, a transition region which is formed with a radius is advantageous. The concave shape is preferably embodied as a hollow throat. The concavity is made continuous or uniform, in particular, from the lower edge of the head base as far as the cylindrical region of the shaft section. The transition from the concave region to the shaft section is, in particular, implemented in a stepless or flush fashion with respect to the outer contour of the connecting element. The entire section between the lower edge of the head base and the shaft section is advantageously formed by the concave region.

Furthermore, it is advantageous that a conical region is formed, in the head section between the head base and the shaft section. Depending on the application, an oblique profile or a chamfer between the head base and the shaft section may be advantageous with respect to simplified manufacture of the connecting element.

When a conical transition and a concave transition between a head base and a shaft section are compared, a concave transition exhibits a significant difference which is advantageous in a series of applications. In particular, when a punch-riveted connection is configured with the concave region a significant reduced bending stress is achieved in the upper component section to be connected. This is because as a result of the comparatively larger space for the upper component section, for example, an upper layer of sheet metal, in relation to a conical region, the upper component section is compressed less in the downward direction, as a result of which a reduced tensile stress acts on the head base or a smaller force acts from below against the head base. This effect can be observed, in particular, in upper or die-side component sections from a very rigid or ultra-high-strength material, for example, from an ultra-high-strength sheet of steel. With the proposed solid punching rivet, it is possible to prevent an adverse effect on the connection as a result of corresponding tearing off of the head base.

A reduction in the notching effect or the notching factor compared to other transitions, for example, step-like or conical transitions, is also achieved here with the concave region.

Hitherto, tearing off of the head base or of the head section in the case of conically extending transitions occurred on a regular basis, to which the notching effect associated with the conical shape at the transition of the conical section to adjacent sections also contributes.

Furthermore, with the concave transition an optimized flow of material of the upper component section into the concavity is achieved as a result of the rounded shape.

In one preferred embodiment of a connecting element according to the present invention, it is advantageous that with respect to the overall length of the connecting element the relative length dimension of the head section with the head base and hollow throat is approximately 20 to 30%, approximately 40 to 60% for the shaft section and approximately 30 to 40% for the foot section. This has become apparent with selected solid punching rivets in practical arrangements for forming a punch-riveted connection.

Furthermore, it is advantageous that the diameter of the foot base is larger than the diameter of the cylindrical shaft section. The foot base diameter may be, for example, approximately 10 to 20% larger. As a result, more space or an enlarged space, for subsequent flowing is available in the shaft section for material which is shaped during the punch-riveting compared to a connecting element with a shaft and a foot base with the same diameter.

According to one advantageous variant of the present invention, the shape of the connecting element is not rotationally symmetrical. It is therefore possible to provide a large number of desired or individual geometries of the connecting element.

A polygonal cross-sectional shape of the connecting element is particularly preferred.

Finally, it is also advantageous if the rivet head has an additional functional region such as, for example, a bolt or a thread, which, in an embodied punch-riveted connection, can protrude from at least one component section over an upper side of an upper component section. It is therefore possible to provide on the connecting element an additional functionality which is already taken into account during the manufacture of the connecting element and/or is prepared on the connecting element which has not yet been used according to applications.

The present invention also relates to a method for manufacturing a connecting element for forming a punch-riveted connection of at least two component sections, in particular, for manufacturing a connecting element according to one of the refinements described above. According to the present invention, the connecting element is manufactured from a material blank using a solid shaping process, wherein the material blank is clamped in a tool with a plurality of segments which engage laterally around the material blank and is shaped compressively in a shaping process. In this way, a connecting element which is predefined in a defined fashion can be formed in an economically and technically advantageous fashion in accordance with one of the abovementioned refinements according to the present invention.

If appropriate, the material blank can be heated for optimized process control, depending on the material and/or the degree of shaping.

Non-rotationally-symmetrical shapes of the connecting element are also readily possible depending on the proposed fabrication process, these being, for example, knob-like embossing, elliptical, polygonal cross sections and/or proud or countersunk structures on the outer side of the connecting element. All the dimensions can be formed in a freely selectable region.

It is also conceivable that the shape of the connecting element changes along the longitudinal axis or rivet axis. For example, the cutting edge can have a round shape and/or the connecting element can have a circular cross-sectional surface at its foot-side end, wherein the shape merges with the polygonal shape along the longitudinal axis of the connecting element. The advantage is anti-rotation protection of the connecting element which is implemented in this way for the rivet connection which is produced.

Pointed rings or elevated portions and pointed depressions or grooves on the connecting element can only be formed to a conditional degree with the proposed method. Pointed grooves can in any case, in certain circumstances, inhibit a flow of material during the manufacture of a punch-riveted connection.

For example, the following head shapes of the connecting element can be manufactured: flat head, truncated cone head, depression or raised portion on the planar surface of the rivet head as a guiding aid or centering aid or functional stamped elements such as, for example, bolts or threads.

With respect to the rivet shaft, the rivet shaft can also be provided with an individual geometry or surface condition for different types of connecting element, in order, for example, to bring about locally higher friction with respect to adjacent regions of the elements to be connected.

Depressions, such as, for example, grooves or the like can be adapted with respect to the geometry of the groove or to a possibly adjacent ring, a waist, a shoulder, for example, a run-in angle and run-out angle or non-rotationally-symmetrical depressions or rounded portions.

The manufacturing method can also be configured in such a way that the foot section or the foot base widens conically with respect to the lower edge which forms a cutting edge. Depressions on the end-side planar surface of the foot section can also be introduced as a guide aid during fabrication.

Depending on the type of the multi-segment tool and/or depending on the number of segments, during fabrication a characteristic burr forms along each tool division or segment division longitudinally on the surface of the connecting element from the upper edge as far as the lower edge. The burrs can be intentionally embodied in such a way that an increased burr is produced, as a result of which an advantageous protection against rotation of the connecting point which is formed with this connecting element is improved.

BRIEF DESCRIPTION OF THE DRAWINGS

Further advantages and features of the invention are explained in more detail with respect to the exemplary embodiments of the invention shown in the figures.

DETAILED DESCRIPTION OF THE INVENTION

Figure 1:
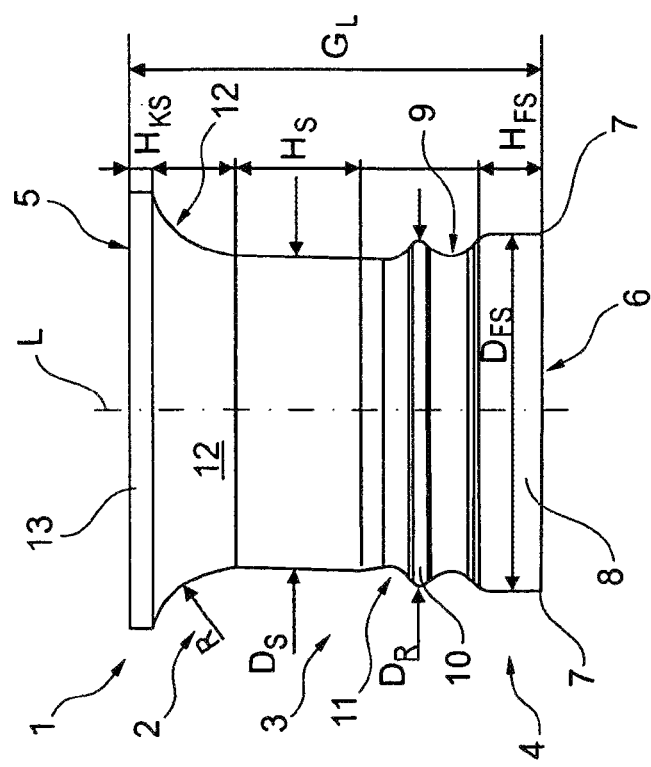
FIG. 1 shows a preferred embodiment of a solid punching rivet according to the invention from the side.

FIG. 1 shows from the side a connecting element according to the invention which is embodied as a solid punching rivet 1, in a shape which is rotationally symmetrical with respect to the longitudinal axis L of the solid punching rivet 1. The solid punching rivet 1 is designed to connect two or more component sections, in particular, sheet-metal components using the punching riveting method. The solid punching rivet 1 comprises various sections over its length along the longitudinal axis L such as a rivet head 2, a rivet shaft 3 and a rivet foot 4. During the manufacture of a punch-riveted connection, a die can act on an upper side 5.

Opposite the upper side 5 there is an underside 6 which, at the start of the solid punch riveting is seated, for example, on a sheet-metal layer lying at the top. The underside 6 is bounded on the outside by a cutting edge 7 which runs all around, and the underside 6 itself bounds on the end side a foot base 8 which is of cylindrical shape and has a height $H_{FS}$ in the direction of the longitudinal axis L. The circumferential cutting edge 7 serves, in particular, to cleanly define a hole diameter of a hole, punched through during the punch riveting, in the upper sheet-metal layer, for example, of three sheet-metal layers to be connected, which is explained in more detail in FIG. 13.

The foot base 8 is of cylindrical design here but it can also have a shape approximated to the cylindrical basic shape, and be, for example, slightly elliptical or slightly conical in cross section. The foot base 8 is adjoined by a groove 9 which runs around in a closed fashion and is of mainly concave design. In the case of solid punch-riveting, deformed material of a lower sheet-metal layer of the sheet-metal layers which are to be connected, which layer is supported on the underside on a bottom die, can flow into the groove 9. A ring 10 which is embodied in a circumferential fashion, and is rounded on the outside and whose diameter $D_R$ is slightly smaller than a diameter $D_{FS}$ of the foot base 8 forms the upper termination of the rivet foot 4.

The relative size information mentioned below relates to the solid punching rivet 1 which is shown by way of example, wherein, in the case of other solid punching rivets according to the invention, other size ratios may be present.

The rivet foot 4 is adjoined by the rivet shaft 3 via a constriction 11 or waist which is slight or countersunk downward only to a small degree. The rivet shaft 3 is of completely cylindrical design here and has a diameter $D_S$ which is approximately 10% smaller than the diameter $D_{FS}$ of the foot base 8. The height $H_S$ of the cylindrical rivet shaft 3 makes up approximately 30% of the overall length $G_L$. As a result of the transition or the jump in diameter from the ring 10 to rivet shaft 3, a shoulder is formed on which deformed material of the component sections to be connected to one another can be supported on the shaft side. The diameter in the groove base of the groove 9 corresponds approximately to the diameter $D_S$ of the rivet shaft 3.

The rivet shaft 3 is adjoined in the upward direction by the rivet head which widens concavely via a hollow throat 12 of the rivet shaft 3 with a radius R, and extends up to a head base 13 which has a height $H_{KS}$ which is approximately just one third of the height $H_{FS}$ of the foot base. The head foot 13 is of cylindrical design like the foot base 8. The head foot 13 is bounded on the inside by an upper planar surface or the upper side 5. By means of the hollow throat 12, a stepless region is implemented between the head base 13 and the rivet shaft 3.

By means of the illustrated solid punching rivet 1 according to FIG. 1, a high tolerance with respect to fluctuations in thicknesses of the sheet metal or of the component is achieved compared to previously used solid punching rivets with the same overall length $G_L$. That is to say the overall thickness of the component sections or of the sheet-metal layers to be connected can vary to a comparatively large degree. The overall thickness, considered in the punching direction, of the plurality of sheet-metal layers to be connected to one another can be, with respect to an overall length $G_L$ of the solid punching rivet 1 of, for example, 4.5 mm, in the range between 100% of the overall length $G_L$ and, for example, 66% of the overall length $G_L$, and pieces of sheet metal with overall sheet-metal thicknesses of, for example, between 4.5 mm and approximately 3.0 mm may therefore be advantageously connected in a punch-riveted fashion.

Furthermore, it is advantageous that with the hollow throat 12 a reduced tensile stress, compared to conical rivet heads, acts in the rivet head 2 from the hollow throat 12 in the direction of the head base 13, which, in particular, counteracts flaking off of the rivet head 2. This is because the hollow throat 12 or the step-free transition to the rivet shaft 3 has the effect that an upper sheet-metal layer is bent less in the downward direction or pulled less under the head base 13 at the connecting point, with the result that the tensile stress on the head base 13 can be reduced.

Furthermore, it is advantageous that slightly deformed material can flow into the constriction 11.

Finally, it is also advantageous that, during the connection process, an optimized flow of material of the component sections to be connected to one another is implemented for the deformation of the sheet-metal material, in particular, as far as the running in of material into the groove 9 or into the constriction 11 is concerned.

Figure 2:
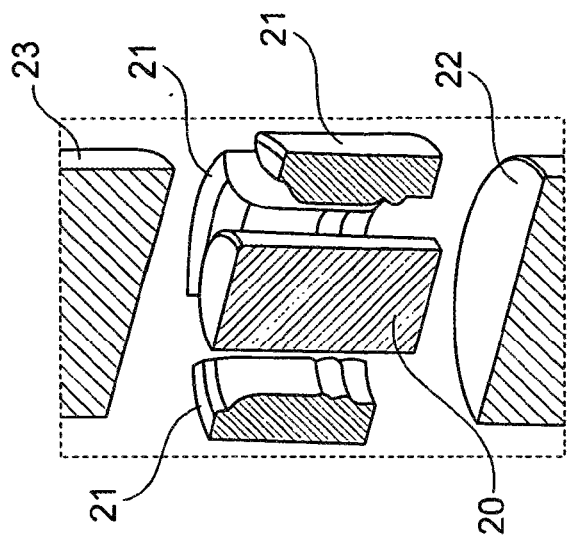
FIG. 2 shows a section through a highly schematic part of an arrangement for manufacturing a solid punching rivet according to FIG. 1.

FIG. 2 shows, in highly schematic form, basic conditions of manufacture of the solid punching rivet 1 according to FIG. 1. In this context, a material blank 20 is positioned relative to tool segments 21, a die 23 and a bottom die 22 and is subsequently shaped in solid fashion with closed tool segments 21.

Figure 3:
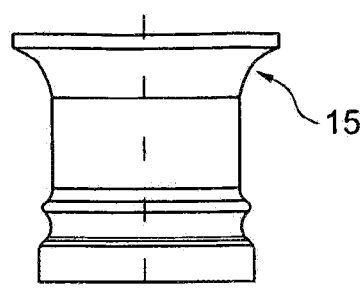
FIGS. 3 to 10 show further embodiment variants of solid-punching rivets according to the invention in a side view.
Figure 4:
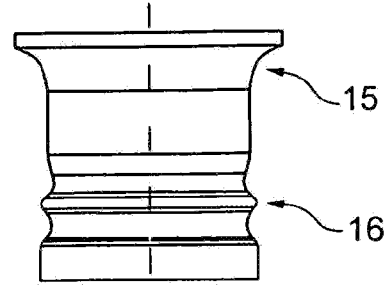
Figure 5:
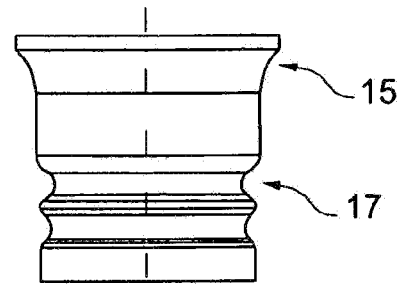
Figure 6:
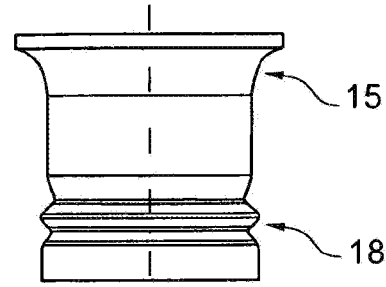
Figure 7:
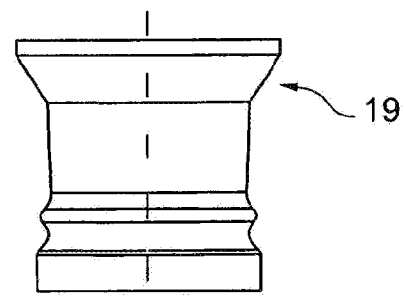
Figure 8:
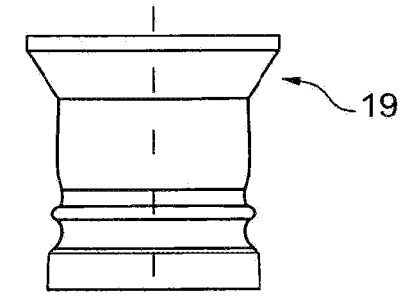
Figure 9:
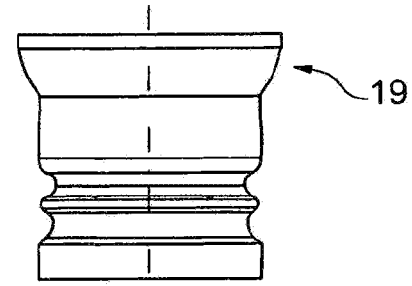
Figure 10:
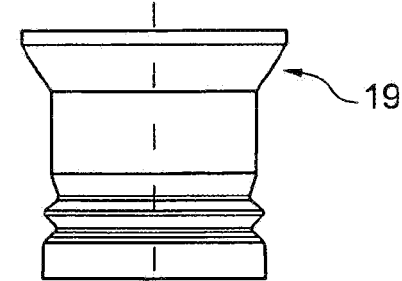

FIGS. 3 to 6, show different further solid punching rivets according to the invention with a concave hollow throat 15 according to the solid punching rivet from FIG. 1 in a side view, wherein details are differentiated from the embodiment according to FIG. 1. FIG. 3 shows, for example, an arrangement without a constriction 11, FIG. 4 shows a widened ring 16, FIG. 5 shows a more pronounced constriction 17, and FIG. 6 shows oblique edges of a ring 18 or of adjacent regions.

FIGS. 7 to 10 shows exemplary embodiments of solid punching rivets according to the invention according to FIGS. 3 to 6, but with a truncated-cone-shaped region 19 instead of the hollow throat 15.

Figure 11:
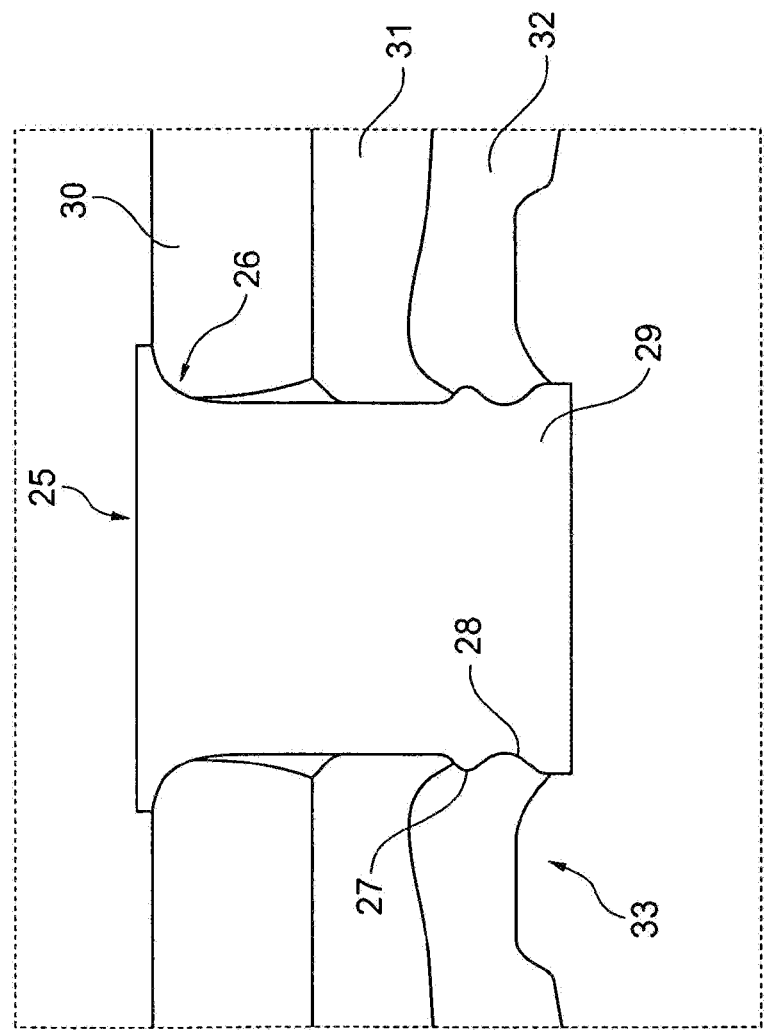
FIG. 11 shows a sectional view through a region of a solid punching-rivet connection with a solid punching rivet according to the invention on three pieces of sheet metal which are connected to one another according to the invention.

FIG. 11 shows a section through a finished solid punch-riveted connection with a solid punching rivet 25 which is shaped in accordance with the solid punching rivet 1, in particular, with a hollow throat 26, and three pieces of sheet metal 30, 31 and 32 which are connected to one another. It is readily apparent that the upper piece of sheet metal 30, which is composed of an ultra-high-strength material is not bent downward, or is bent downwards to a virtually imperceptible degree, since, as a result of the hollow throat 26, sufficient space is available for the piece of sheet metal 30.

A ring 27 serves to support the central and lower pieces of sheet metal 31 and 32. A groove 28 is filled with the lower sheet-metal layer 32. Furthermore, on the underside of the piece of sheet metal, a closed annular groove 33 is present adjacent to the foot base 29 and concentrically with respect to the solid punching rivet 25, the annular groove 33 being provided on the bottom die side in order to improve the anchoring of the lower piece of sheet metal 32 by means of the groove 28.

LIST OF REFERENCE NUMERALS

1 Solid punching rivet
2 Rivet head
3 Rivet shaft
4 Rivet foot
5 Upper side
6 Underside
7 Cutting edge
8 Foot base
9 Groove
10 Ring
11 Constriction
12 Hollow throat
13 Head base
14 Region
15 Hollow throat
16 Ring
17 Constriction
18 Ring
19 Region
20 Wire section
21 Tool segment
22 Bottom die
23 Die
24
25 Solid punching rivet
26 Hollow throat
27 Ring
28 Groove
29 Foot base
30 Piece of sheet metal
31 Piece of sheet metal
32 Piece of sheet metal
33 Annular groove

The invention claimed is:

1. A connecting element for forming a punch-riveted connection of at least two component sections, wherein the connecting element includes a head section, a foot section and a shaft section which extends between the head section and the foot section, and the foot section has at its free end a foot base with a basic shape which is cylindrical or at least approximately cylindrical, wherein a single annular circumferential elevated portion is formed in the foot section between the foot base and the shaft section, wherein the shaft section has a diameter which is smaller than a diameter of the foot base, and wherein the shaft section is formed cylindrically over a substantial part of its extent.

2. The connecting element according to claim 1, wherein the shaft section is formed without an elevated portion over its longitudinal extent.

3. The connecting element according to claim 1, wherein the shaft section has, when viewed in the longitudinal direction of the connecting element, a shape which differs from the cylindrical shape.

4. The connecting element according to claim 1, wherein the circumferential elevated portion has an outer diameter which is slightly smaller than a diameter of the foot base.

5. The connecting element according to claim 1, wherein a circumferential constriction is present in a region in which the shaft section merges with the foot section.

6. The connecting element according to claim 1, wherein a circumferential elevated portion merges with adjacent sections via substantially concavely shaped regions.

7. The connecting element according to claim 6, further comprising a circumferential depression in the foot section between the foot base and the circumferential elevated portion.

8. The connecting element according to claim 1, wherein the head section has at its free end a head base with a basic shape which is cylindrical or approximately cylindrical.

9. The connecting element according to claim 1, wherein a concavely formed region, which is arranged between the head base and the shaft section, is formed in the head section.

10. The connecting element according to claim 1, wherein a conical region is formed in the head section, between the head base and the shaft section.

11. The connecting element according to claim 1, wherein the shape of the connecting element is not rotationally symmetrical.

12. The connecting element according to claim 1, wherein the cross-sectional shape of the connecting element is polygonal.

13. The connecting element according to claim 1, wherein the cross-sectional shape changes, starting from a circular cross section in the region of a cutting edge at the free end of the foot base, into a polygonal cross-sectional shape along a longitudinal axis of the connecting element.

14. The connecting element according to claim 1, wherein the rivet head has an additional functional region which, in an embodied punch-riveted connection, protrudes from at least one component over an upper side of an upper component section.

15. A method for manufacturing a connecting element for forming a punch-riveted connection of at least two component sections according to claim 1, the method comprising the steps of:
positioning a material blank relative to tool segments, a die and a bottom die; and
subsequently compressively shaping the material blank into the connecting element in a solid fashion by closing the tool segments around the material blank and between the die and the bottom die.

16. The connecting element according to claim 14, wherein the additional functional region is a bolt or a thread.

* * * * *